Aug. 21, 1928.
C. E. VAWTER
1,681,314
FUEL GAUGE FOR MOTOR VEHICLES
Original Filed Jan. 8, 1921    2 Sheets-Sheet 1
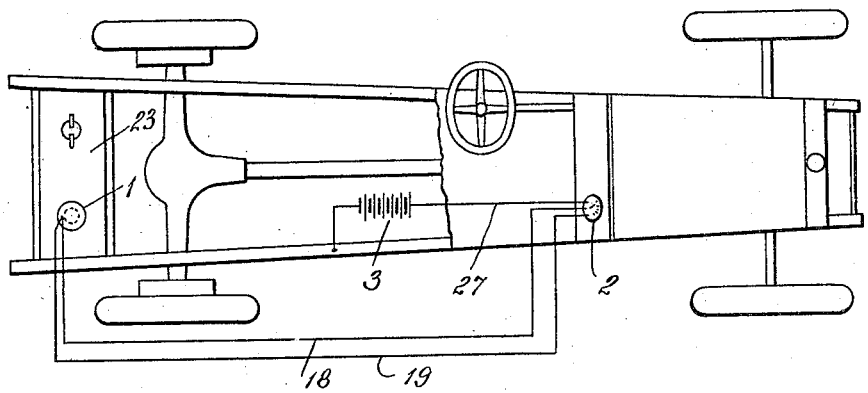
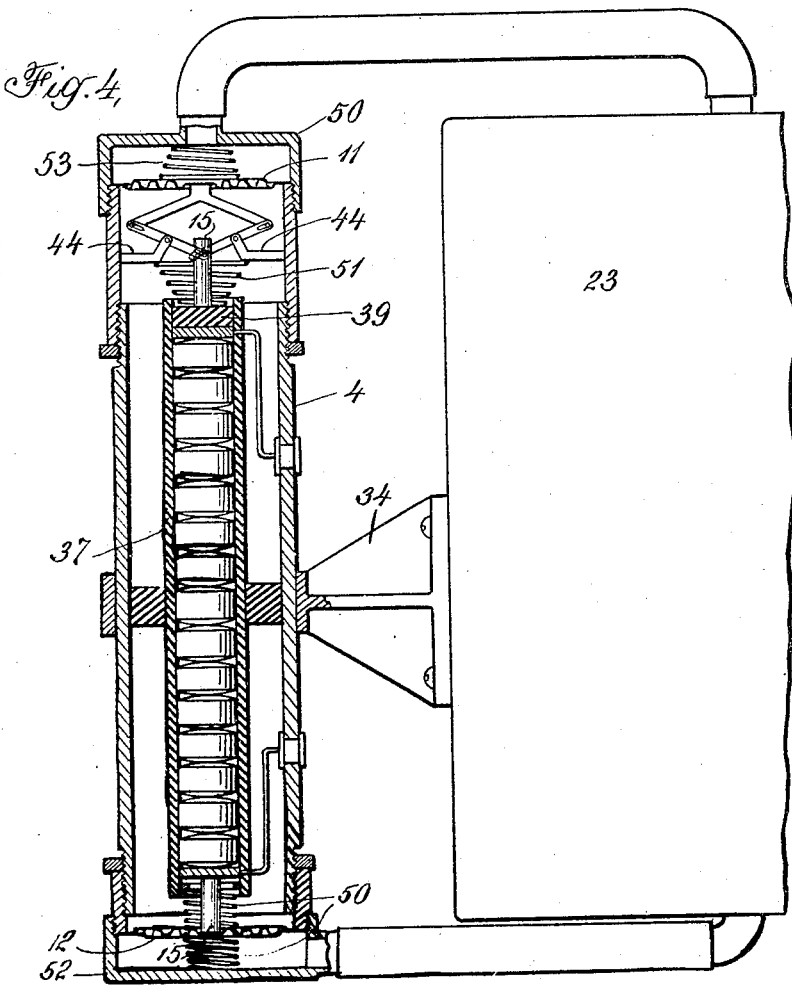
Inventor
Charles E. Vawter

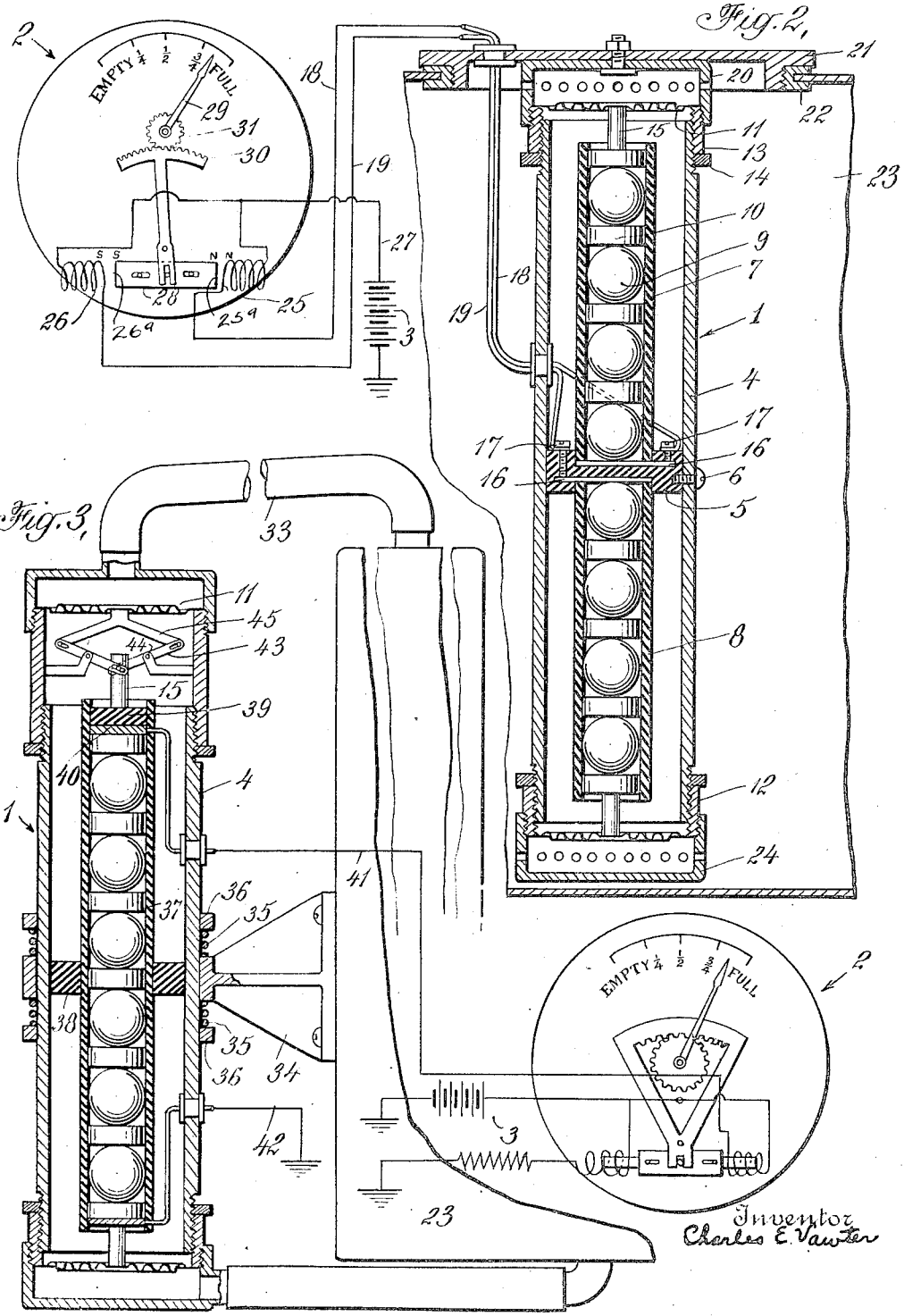

Patented Aug. 21, 1928.

1,681,314

UNITED STATES PATENT OFFICE.

CHARLES E. VAWTER, OF PHILADELPHIA, PENNSYLVANIA.

FUEL GAUGE FOR MOTOR VEHICLES.

Application filed January 8, 1921, Serial No. 435,804. Renewed January 13, 1928.

This invention relates to improvements in gasoline gauges for automobiles, and has for its object to provide a gauge for measuring gasoline in the tank of an automobile and indicating the quantity in the tank upon an instrument located for convenient observation by the driver of the car, regardless of the position in which the tank is carried. For instance, the indicator may be located upon the instrument board of the car to indicate the quantity of gasoline in a tank carried at the rear of the car in the usual position.

The only gauges at present employed for vehicle tanks are of the float-operated type. These devices are not altogether satisfactory themselves for the reason that floats and other moving parts submerged in the tank are themselves liable to jam and get out of order, due to the vibration of the car and the sloshing of the liquid in the tank, and in the more recent cars of practically all makes, the tank is located at the rear of the car so that the quantity of fuel remaining in the tank can be determined only by getting out of the car and reading the float gauge index which is mounted on the tank itself, or measuring the quantity with a ruler if the gauge is not working properly.

To obviate this annoyance it has been proposed to connect the moving element of float gauges through rods and cables with an index on the instrument board, and in various other ways to indicate on the instrument board the position of the float in the tank. Such devices have, however, not met with favor for the reason, aside from the inherent defects of the float mechanism itself, that motion transmitting mechanism sufficiently sensitive to be operated by the weight of a small float, yet capable of withstanding the jar and vibration of the vehicle, cannot be satisfactorily produced within the cost limit permissible for a device of this character.

By my present invention I provide a fuel indicator in which the use of floats and similar movable parts in the tank are avoided and which will give its depth indication at any distant point without intervening motion-transmitting mechanism.

My invention also provides a gasoline gauge giving an accurate reading at a distant point which can be manufactured at low cost, and which can be readily installed in the tanks of cars now in use as well as made part of the equipment of new cars.

To this end my improved gauge comprises primarily a pressure-sensitive diaphragm exposed to the pressure of the fuel in the tank in such manner that the pressure on the diaphragm will vary with the depth of the fuel, and an electrical resistance element whose resistance is varied by the pressure on the diaphragm so that an electric current passed through the resistance will be correspondingly varied and may be used to operate a simple electrical indicator with its scale calibrated in terms of the contained fuel. By this arrangement the entire mechanism in the tank is hermetically sealed so as to be unaffected save by the pressure of the liquid as determined by its depth, and the indicating instrument can be located at any point to which a wire can be run.

In the accompanying drawings I have illustrated several different arrangements whereby my invention may be carried into effect, and in the said drawings, Figure 1 is a plan view of an automobile showing the arrangement of my improved gauge when applied to a tank carried at the rear of a car;

Fig. 2 shows one form of my improved gauge in vertical section with the electrical indicator with which it is used, diagrammatically illustrated;

Fig. 3 is a similar view of a modified form of instrument; and

Fig. 4 is a similar view showing further modifications in the pressure-sensitive instrument.

Referring to the drawings, particularly to Figs. 1 and 2, 1 indicates the pressure-sensitive element to be supported in the tank or connected thereto so that its diaphragm is subjected to the pressure of the liquid in the tank 23, which, as shown, is supported at the rear of the vehicle. 2 indicates the electrical indicating instrument located on the instrument board of the car. The instrument selected for illustration is of the ammeter type and is connected in series with the pressure-sensitive part 1 across the terminals of the storage battery 3 of the car-lighting system.

The pressure-sensitive element 1 in the modification shown in Fig. 2 comprises a tubular casing 4 preferably of metal. Supported in the casing 1 at about its middle point is a disk 5 of fibre or other insulating material, the disk being held in fixed position, as by a screw 6. Seated in the disk and fastened thereto on its opposite sides are two tubes 7 and 8, respectively, of fibre or other insulating material, these tubes being of much smaller diameter than the casing 4 and containing a series of carbon spheres and disks 9 and 10, respectively, the two carbon piles being insulated from each other by the intervening disk 5.

The casing 4 is provided at each end with pressure-sensitive diaphragms 11 and 12, respectively, generally similar to the diaphragms employed on aeronoid barometers, which diaphragms are preferably mounted for adjustment longitudinally of the casing 4. As shown, each diaphragm is mounted on a sleeve 13 threaded on the end of the casing 4 with a lock nut 14 carried by the thread to lock the sleeve in its adjusted position.

Attached to the center of each diaphragm is a plunger 15 of metal adapted to engage the outermost disk 10 of the carbon pile.

The bottom elements of the carbon piles are in contact with conducting strips 16 embedded in the fibre disk 5 and extending across the bottom of the tubes 7 and 8, and each conducting strip 16 is provided with a binding post 17 to which the conductors 18 and 19, respectively, lead from the indicator on the instrument board of the car, the operation of which will be later described.

The instrument shown in Fig. 2 is designed to be submerged in the tank itself, and to that end the end cap 20 at its upper end is attached by a suitable bolt to a cover plug 21 adapted to screw into a threaded collar 22 set in the upper wall of the tank 23. The cap 20 and the corresponding cap 24 at the other end of the casing are provided to protect the diaphragms from possible injury from the liquid sloshing around in the tank, but each cap has a series of openings through which pressure at the two different levels of the tank will be transmitted to the diaphragms.

The conductors 18 and 19 pass through the walls of the casing through a gas- and liquid-tight joint, and are preferably passed through the cover plug 21 by means of a similar joint whereby the entire casing 4 and its connections may be removed from the tank when necessary for adjustment or other purposes.

With the arrangement shown in Fig. 2 a double coil instrument is used of a type which will give a reading proportional to the difference between the energization of its coils, irrespective of variations in the strength of the current through the coils, so long as it is equal for both coils. Any instrument of this general type and of satisfactory design will serve the purpose. I have illustrated for the purpose a simple instrument comprising two fixed coils 25 and 26 connected, respectively, to the opposed carbon piles through the conductors 18 and 19, respectively, the coils being energized through a common lead 27 from the battery 3. The coils are identical and as the opposite ends of each carbon pile are grounded through their plungers 15 and diaphragms to the other pole of the battery the current passing through the coils will be inversely proportional to the resistance of the respective carbon piles. The two coils 25 and 26 have cores $25^a$ and $26^a$, respectively, attached to the opposite ends of an armature 28, the movement of which actuates an index hand 29 through a segment 30 attached to the armature and a pinion 31 on the spindle of the index hand.

The instrument is provided with a scale calibrated to indicate the quantity of fuel in the tank, for instance, with the usual full and empty indications and intervening fractional notations. The gear 31 and segments 30 are connected so that the index hand stands at "Empty" when the armature 28 lies at its normal position with the two cores projecting equally into the two coils.

The operation of the above described instrument is as follows: Before the part 1 is placed in position in a tank the adjustable sleeves 13 carrying the diaphragms will be screwed on to their threads to such relative positions that the electrical resistance through the two carbon piles is equal and the index hand 29 stands at "Empty". The sleeves 13 will then be locked in place with their lock nuts, and the casing 4 will be placed in the tank in the position shown. When the tank is filled the pressure on the lower diaphragm 12 will be increased while the pressure on the upper diaphragm will not be affected. The result will be a lowering of the resistance in the lower carbon pile with an increase of current through the coil 26 and a corresponding deflection of the armature 28, thereby turning the index hand away from the "Empty" mark to a position corresponding with the depth of liquid in the tank, the initial resistance of the two carbon piles being so adjusted in the first place that the addition of the pressure resulting from the full depth of the fuel in the tank will produce a variation sufficient to deflect the armature through the full amplitude permitted by the movement of the index hand.

Two diaphragms are provided in the manner shown, so that the pressure measured will be the differential pressure between the open space of the tank and the submerged diaphragm at the bottom of the tank. Were the absolute pressure on the diaphragm measured the instrument would have to be differently calibrated for variations in sea level as well as for different pressure feed systems and would only be a correct indication when used under the exact conditions for which the instrument was initially adjusted. With the double diaphragm instrument above described, variations in the absolute pressure to which the diaphragm is subjected have substantially no effect upon the accuracy of the instrument. This is assured by having the initial pressure imposed by the diaphragms in the carbon piles greatly in excess of the pressure imposed on the lower diaphragm by the full depth of the gasoline in the tank, whereby equal variations in the pressure on both diaphragms, as occasioned for instance by different altitudes, will not materially affect the ratio between the initial resistance of both circuits and the change in the resistance of the lower carbons resulting from the pressure of the fuel.

By making both diaphragms adjustable in the manner shown, the initial pressure on the carbon piles may be adjusted from time to time, as may be necessary, to correct variations in resistance due to wear of the carbon spheres and disks making up the two piles. I have found in practice that the necessity for this adjustment is theoretical rather than real, as the wear of the carbons, particularly if the contacting faces are polished, is negligible even when subjected to excessive and continued vibration. This adjustment is, however, advantageous in permitting the instrument to be readily set when first installed, and also permits a single style of instrument to be used with batteries of different voltages.

It will be noted that the pressure-sensitive device contains no moving parts, particularly no bearings, to wear and get out of order, and with an occasional readjustment of the diaphragms the instrument should last as long as the car.

Instead of using a pressure-sensitive instrument with two separate resistance piles such as described, I may so construct the instrument as to employ a single resistance in what may be called the tank circuit, this resistance varying in proportion to the pressure difference at the top and bottom of the tank. Fig. 3 shows such a construction, and as there shown the pressure-sensitive element 1 is supported outside the tank with its opposite diaphragms 11 and 12 in communication with the top and bottom of the tank, respectively, through flexible hose connections 33 leading to the middle of the upper and lower walls of the fuel tank so that the measured level will be the same in all positions of the tank. By this arrangement the casing 4 may be spring-supported to avoid any liability of the accuracy of the instrument being affected by the jar of the vehicle. To this end the casing 4 is supported in a bracket 34 attached to the side of the tank, the bracket and casing being connected through springs 35 working between the bracket and collars 36 on the casing 4.

The mechanism within the casing 4 comprises a single fibre tube 37 fixed in the casing in any suitable manner as, for instance, by a bridge piece 38, the tube 37 being filled from end to end with carbon disks and spheres. The disk at the lower end is directly engaged by the plunger 15 attached to the diaphragm 12, while the disk at the upper end is separated from the plunger 15 by the plug or washer 39 of fibre. Between each end of the carbon pile and the fibre disk or plug 15 is arranged a metal washer 40 to which flexible conductors 41, 42 are attached, the conductor 41 being insulated in its passage through the wall of the casing 4 and leading to one coil of the instrument 2 which may be of the same construction as that illustrated in Fig. 2.

The diaphragm 11 at the upper end of the casing is not connected directly to the plunger 15, but is attached to it through a lever system comprising a pair of levers 43 supported on fixed fulcrums 44, the inner ends of the lever being connected through a pin and slot connection with a cross pin in the end of the plunger 15, while the outer ends of the levers are similarly connected to the ends of a fork 45 attached to the center of the diaphragm. By this arrangement the pressure on the exposed surface of the diaphragm 11 tends to raise the plunger 15, while the pressure on the exposed surface of the diaphragm 12 tends to raise the other end of the carbon pile. By this construction, the resistance of the carbon pile will not be altered so long as the pressure on the two diaphragms is varied in the same degree, whereas a difference in the variations of the pressure on the two diaphragms will produce a corresponding difference in the resistance of the carbon pile.

The diaphragm-supporting collars 13 are adjusted in the first instance to place such initial pressure upon the carbon pile that the index hand stands at "Empty" when there is no gasoline in the tank. Different quantities of fuel in the tank will thus produce different degrees of pressure on the lower diaphragm, while the pressure on the upper diaphragm will not be varied. Consequently the current through the instrument will be reduced and the hand deflected proportionately. When, however, the car is taken to a higher or lower altitude, or the pressure on both diaphragms is correspondingly changed an equal amount, the pressure on the carbon pile will not be altered, as the pressure on the upper plunger will be relieved in the same degree as the pressure on the other plunger is increased, or vice versa, thus tending to shift the carbon pile as a whole longitudinally of the tube 37.

By suspending the instrument on springs 35 in the manner shown, any variation in the reading from time to time due to the vibration of the car will be avoided, and also the necessity for periodic adjustment of the resistance to compensate for the wear of the contacting points of the carbon faces, will be eliminated or reduced. It is to be noted that in the embodiment of Figure 3 the current traversing one of the coils of the indicating instrument traverses the carbon pile while the current traversing the other coil of the instrument passes through a fixed resistance to ground as shown, to thus maintain a constant current through this coil for a given battery voltage.

In Fig. 4 I have shown a modified arrangement of compensating springs for protecting the carbon pile from vibration of the car. In this arrangement the casing 4 is rigidly attached to its bracket, and springs are provided at each end of the instrument tending to hold the diaphragms against vibration in both directions. As shown, the springs 50 at the lower end of the instrument press directly against the diaphragm, the springs working respectively against a collar set in the end of the tube 37 and the lower cap 52. The inner spring 51 of the upper diaphragm works between the plug 39 at the top of the carbon pile and the under side of the fulcrum pieces 44 thereby tend to raise the diaphragm through its lever system, the pressure of the spring being opposed by a spring 53 of equal strength interposed between the diaphragm and the upper cap 54. By this arrangement the diaphragms and the carbon pile are spring-suspended in both directions, and the jar on them from the vibration of the car will be materially reduced.

I have described the electrical instrument as preferably formed of two coils balanced against each other, both for use in connection with the device shown in Fig. 2 and the devices shown in Figs. 3 and 4. It will of course be understood, however, that in lieu of such instrument an ordinary ammeter or other single coil instrument calibrated to read in depth of fuel may be used with the fixed resistance described in connection with Figs. 3 and 4 replaced by a spring against which the pull of the coil is opposed. It will also be obvious that various changes may be made in the details of construction without departing from the scope of the invention as defined in the appended claims.

The claims in this application are directed to the combination of the double diaphragm pressure-sensitive element with an indicator for indicating the difference in pressure on the two elements. Other features of the invention disclosed but not claimed herein are claimed in my co-pending applications, Ser. No. 122,019, and Ser. No. 122,020, filed July 12, 1926.

I claim:

1. In a gauge for fuel tanks of motor vehicles, the combination with a fuel tank of a pressure-sensitive electrical resistance means therein comprising two pressure surfaces exposed, respectively, to the pressure existing in the top and bottom of the tank and a pair of electrical resistances the value of one of which is altered by variations in pressure and an electrical measuring instrument connected to both said resistances and including means to indicate variations in the pressure on the two pressure receiving surfaces but to be unaffected by changes in pressure affecting the two surfaces equally.

2. In a gauge for fuel tanks of motor vehicles, the combination with a fuel tank of a pressure-sensitive electrical resistance means therein comprising two pressure surfaces exposed, respectively, to the pressure existing in the top and bottom of the tank and a pair of electrical resistances subject, respectively, to the pressure on said surfaces and whose resistance is altered thereby, separate circuits for said two resistances and a measuring instrument having two opposed coils connected to said circuits, respectively, and adapted to indicate variations in the current in the two circuits but to be unaffected by equal changes in the current in the two circuits.

In testimony whereof I affix my signature.

CHARLES E. VAWTER.